(12) United States Patent
Makino et al.

(10) Patent No.: US 7,791,335 B2
(45) Date of Patent: Sep. 7, 2010

(54) RESOLVER, MOTOR, POWER STEERING APPARATUS AND METHOD OF MANUFACTURING THE RESOLVER

(75) Inventors: Yusuke Makino, Kyoto (JP); Keita Nakanishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 125 days.

(21) Appl. No.: 12/351,080

(22) Filed: Jan. 9, 2009

(65) Prior Publication Data
US 2009/0179529 A1 Jul. 16, 2009

(30) Foreign Application Priority Data
Jan. 11, 2008 (JP) .............................. 2008-004212

(51) Int. Cl.
G01B 7/30 (2006.01)
H02K 24/00 (2006.01)
H02K 3/00 (2006.01)

(52) U.S. Cl. .................... 324/207.25; 310/168; 310/180

(58) Field of Classification Search ............ 324/207.25; 336/182, 188; 310/180, 210, 166, 168
See application file for complete search history.

(56) References Cited

U.S. PATENT DOCUMENTS

| | | | | |
|---|---|---|---|---|
| 3,281,655 A | * | 10/1966 | Blasingame | 323/348 |
| 3,641,467 A | * | 2/1972 | Ringland et al. | 336/5 |
| 4,631,510 A | * | 12/1986 | Nagarkatti et al. | 336/135 |
| 4,891,590 A | * | 1/1990 | Hammel et al. | 324/207.17 |
| 6,891,365 B2 | * | 5/2005 | Nakano et al. | 324/207.25 |
| 7,215,116 B2 | | 5/2007 | Nishimura | |
| 7,268,537 B2 | * | 9/2007 | Nakano et al. | 324/207.25 |
| 7,408,340 B2 | * | 8/2008 | Ijima | 324/207.25 |
| 7,511,481 B2 | * | 3/2009 | Ijima | 324/207.25 |
| 2007/0085531 A1 | * | 4/2007 | Ijima | 324/207.25 |

FOREIGN PATENT DOCUMENTS

| | | | |
|---|---|---|---|
| JP | 58-207850 | * | 12/1983 |
| JP | 06-229780 A | | 8/1994 |
| JP | 11-037795 | * | 2/1999 |
| JP | 2004-159462 | * | 6/2004 |
| JP | 3681167 B2 | | 8/2005 |
| JP | 2006-125995 | * | 5/2006 |
| JP | 2007-322132 | * | 12/2007 |

* cited by examiner

*Primary Examiner*—Burton Mullins
(74) *Attorney, Agent, or Firm*—Keating & Bennett, LLP

(57) ABSTRACT

A resolver includes a stationary unit centered about a center axis, and a rotary unit disposed inside or outside the stationary unit to be rotatable around the center axis with respect to the stationary unit. The stationary unit includes teeth radially arranged around the center axis, and an insulator covering surfaces of the teeth. The stationary unit further includes output coils formed on the teeth by winding at least one of two output wires around each of the teeth via the insulator in a first number of turns and in multiple layers, and excitation coils formed on the teeth by winding an excitation wire around the output coils in multiple layers and in a second number of turns less than the first number of turns.

7 Claims, 19 Drawing Sheets

RESOLVER, MOTOR, POWER STEERING APPARATUS AND METHOD OF MANUFACTURING THE RESOLVER

BACKGROUND OF THE INVENTION

1. Field of the Invention

The present invention relates to a resolver, which detects a rotational angle of a target object; an electric motor having the resolver; a power steering apparatus having the motor; and a method of manufacturing the resolver.

2. Description of the Related Art

Generally, a hydraulic power steering apparatus is used as a means for assisting steering of a vehicle. The hydraulic power steering assists manipulation of a steering wheel using hydraulic pressure generated from a pump which is actuated by an engine output. Recently, an electric power steering apparatus (hereinafter, referred to as an "EPS") is used to assist handling of a steering wheel of a vehicle in such a way as to rotate a motor using a battery installed in the vehicle. The EPS is gaining popularity, because it is a more efficient system which reduces a power loss of an engine, compared to the hydraulic power steering apparatus which generates hydraulic pressure using the output of the engine.

In order to achieve a high accuracy control system, the EPS requires an angle detector which accurately detects a rotational angle of the motor. Meanwhile, vehicles are required to be accurately operated over a long period of time under various conditions. Therefore, the angle detector for the EPS which is one of components of a vehicle must also have high reliability. To achieve the above purpose, a variable reluctance type resolver which has a high detecting accuracy and which has high durability, compared to an optical encoder or a magnetic encoder, is used as the angle detector for the EPS.

In such a resolver, excitation coils and output coils of a stator unit are formed on teeth by winding wires around the teeth using a winder. Here, to enhance the detection accuracy of the resolver, the excitation coils and the output coils must be accurately formed. For this, promotion of high performance of the winder may be considered. However, in this case, the cost of manufacturing the winder is increased, and there is a technical limitation in enhancing the accuracy in winding the wires.

SUMMARY OF THE INVENTION

In order to overcome the problems described above, preferred embodiments of the present invention provide a resolver including: a stationary unit of an annular shape centered about a center axis; and a rotary unit of an annular shape centered about the center axis, the rotary unit disposed inside or outside the stationary unit and supported so as to be rotatable around the center axis with respect to the stationary unit. The stationary unit preferably includes: teeth radially arranged around the center axis such that first ends of the teeth face the rotary unit; an insulator arranged to cover surfaces of the teeth; output coils include at least one of two output wires wound around each of the teeth via the insulator in a first number of turns; and excitation coils including at least one excitation wire around at least the output coils in a second number of turns less than the first number of turns such that at least one excitation wire overlaps the at least one of the output wires.

In each of the teeth, the first number of turns may be three or more times as much as the second number of turns.

In each of the teeth, a winding pitch of the output wire of each of the layers of the output coil may differ from a winding pitch of the excitation wire of each of the layers of the excitation coil.

The two output wires may be wound around the teeth alternately in a circumferential direction around the center axis.

In accordance with a second aspect of the present invention, there is provided an electric motor, including: the resolver; a motor stator unit having an armature; a motor rotor unit having a field magnet to generate a torque centered about the center axis between the armature and the field magnet, the motor rotor unit supporting the rotary unit of the resolver thereon; and a bearing mechanism supporting the motor rotor unit so as to be rotatable around the center axis with respect to the motor stator unit.

In accordance with a third aspect of the present invention, there is provided an electric power steering apparatus to assist steering of a vehicle, including: the motor; a sensor to detect a force applied to a steering wheel; and a control unit to control the motor depending on an output from the sensor.

In accordance with a fourth aspect of the present invention, there is provided a method of manufacturing a resolver, having a stationary unit of an annular shape centered about a center axis, and a rotary unit of an annular shape centered about the center axis, the rotary unit being disposed inside or outside the stationary unit and supported so as to be rotatable around the center axis with respect to the stationary unit, the method including: a) preparing teeth radially arranged around the center axis, and the stationary unit having an insulator covering surfaces of the teeth; b) forming output coils on the respective teeth by winding at least one of two output wires around each of the teeth via the insulator in a first number of turns; and c) forming excitation coils formed on the respective teeth by winding an excitation wire around the output coils in a second number of turns less than the first number of turns such that the excitation wire overlaps at least one of the output wires.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
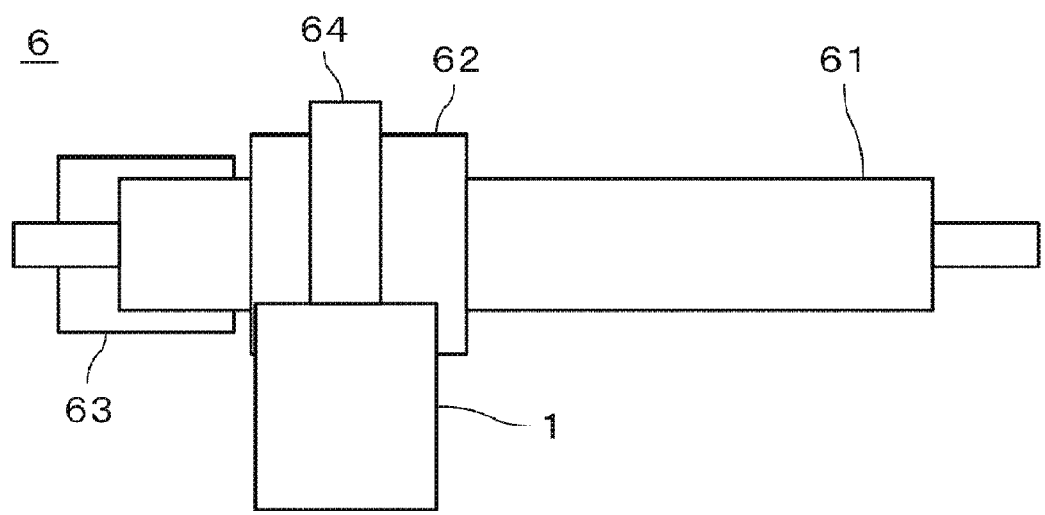
FIG. 1 illustrates a power steering apparatus, according to a first preferred embodiment of the present invention.

Hereinafter, preferred embodiments of the present invention will be described with reference to the accompanying drawings. In the description of the preferred embodiments of the present invention made herein, the terms, for example, "upper", "lower", "left" and "right" used in explaining the positional relationship and orientation of individual members are intended to designate the positional relationship and orientation in the drawings and not to designate the positional relationship and orientation when build in an actual device.

FIG. 1 illustrates an electric power steering apparatus 6 which has a resolver, according to a first preferred embodiment of the present invention. The power steering apparatus 6 is preferably used to assist steering of a vehicle.

As shown in FIG. 1, the power steering apparatus 6 preferably includes a shaft part 61 connected to a steering mechanism, such as a steering wheel, an axle for example; a sensor 62 which detects a force applied to the steering wheel; and a control unit 63, which calculates based on the detection of the sensor 62 a force necessary to assist the steering. The power steering apparatus 6 preferably further includes a motor 1 which generates based on the calculation of the control unit 63 a torque; and a deceleration unit 64 which decelerates the motor 1 and transmits the torque of the motor 1 to the steering mechanism.

In the vehicle having the power steering apparatus 6, the motor 1 of the power steering apparatus 6 is preferably actuated in response to the force applied by an operator to the steering wheel. The torque of the motor 1 preferably assists the rotation of the steering wheel. Therefore, the power steering apparatus 6 preferably assists the rotation of the steering wheel without directly using the output of an engine. Thus, the operator can rotate the steering wheel just using a relatively small force.

Figure 2:
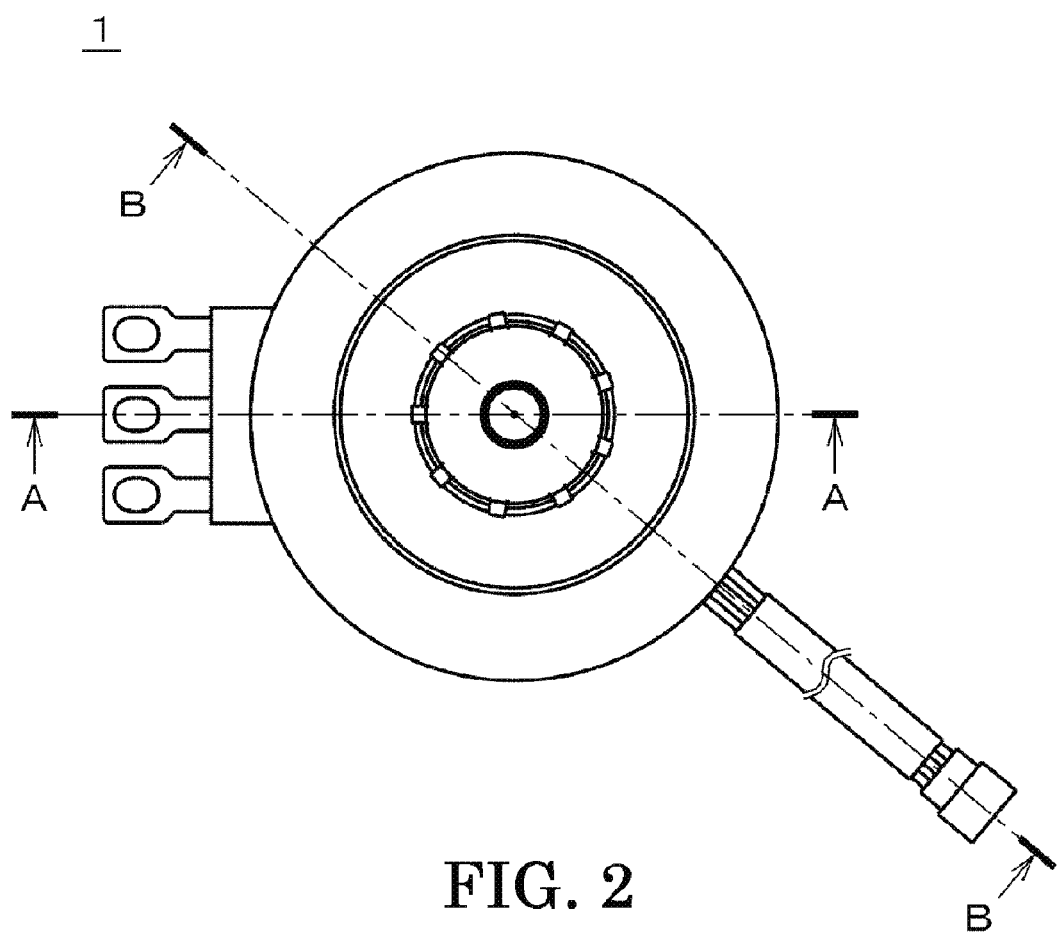
FIG. 2 is a plan view of a motor according to the first preferred embodiment of the present invention.
Figure 3:
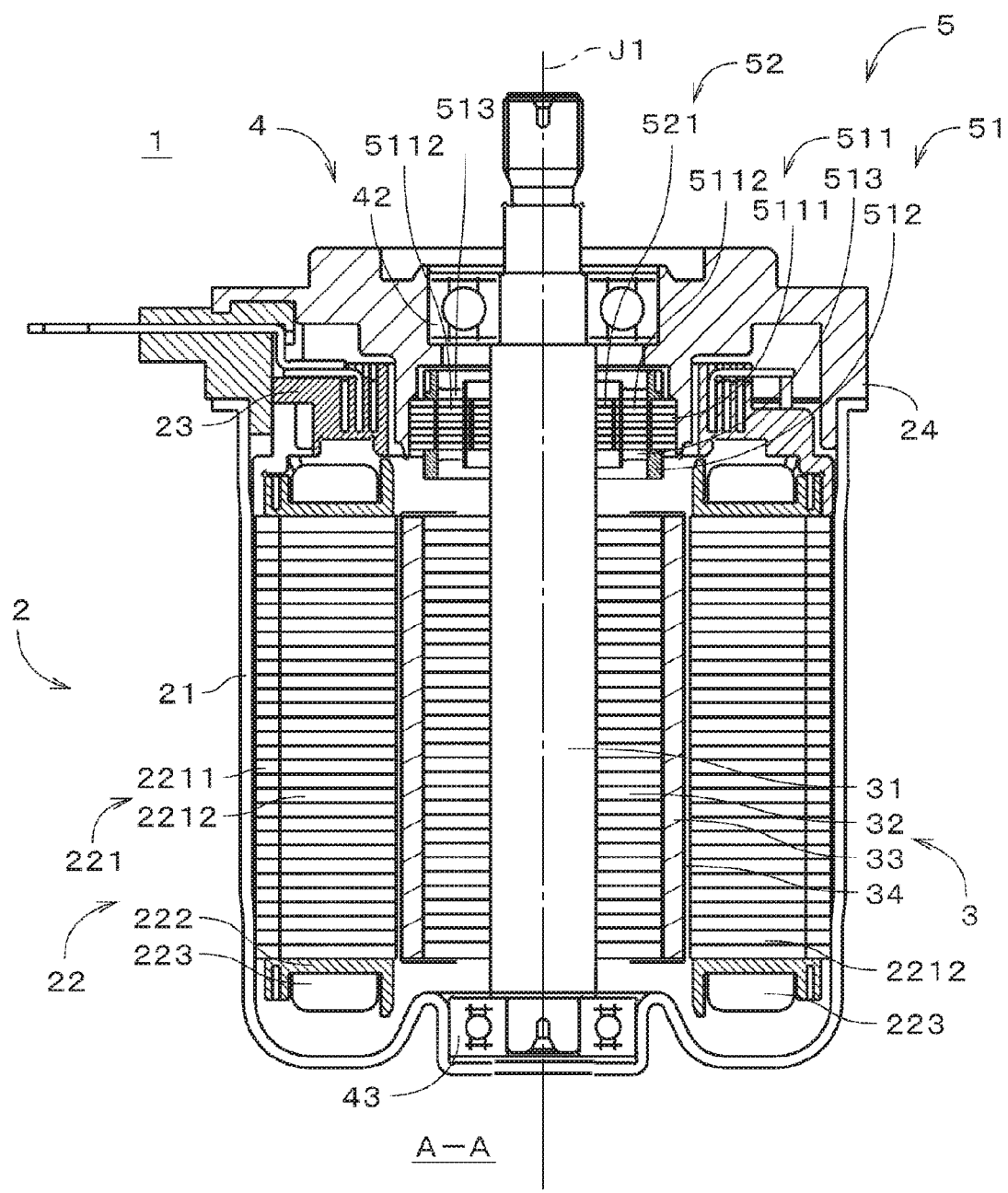
FIG. 3 is a longitudinal sectional view of the motor according to the first preferred embodiment of the present invention.

FIG. 2 is a plan view of the motor 1. FIG. 3 is a sectional view taken along the line A-A of FIG. 2. FIG. 3 shows the sectional view having a plane including a center axis J1 of the motor 1, in which hatch lines with respect to a housing 21 are omitted. As shown in FIG. 3, the motor 1 is preferably an inner rotor type motor and includes a motor stator unit 2 which is a stationary assembly, and a motor rotor unit 3 which is a rotatable assembly. The motor 1 further includes a bearing mechanism 4 which rotatably supports the motor rotor unit 3 with respect to the motor stator unit 2 around the center axis J1, and a variable reluctance type resolver 5 which is an angle detector detecting an angle of the motor rotor unit 3 with respect to the motor stator unit 2. In the following description, to facilitate the understanding of the present invention, a side of the resolver 5 is designated as an upper side and a side of the motor stator unit 2 and the motor rotor unit 3 is designated as a lower side on the basis of the case where the center axis J1 is vertically oriented, but the center axis J1 does not necessarily need to correspond to the direction of gravity.

The motor stator unit 2 preferably includes a housing 21 which has a substantially cylindrical shape that is closed on a bottom thereof, an armature 22, a busbar unit 23, and a bracket 24 which has a substantially cylindrical shape. The armature 22 is preferably attached to the circumferential inner surface of the housing 21. The busbar unit 23 is preferably attached to the housing 21 above the armature 22 and connects the armature 22 to an external power supply. The bracket 24 is preferably coupled to the housing 21 above the busbar unit 23.

The armature 22 preferably includes a stator core 221 which is formed by placing thin silicon steel plates on top of one another. The stator core 221 preferably includes an annular core-back 2211 and teeth 2212 (for example, twelve teeth in this preferred embodiment) which extend predetermined lengths from the core-back 2211 towards the center axis J1. The armature 22 preferably further includes an insulator 222 which substantially covers the surface of the stator core 221, and coils 223, each of which is formed by winding a conductive wire around each of the teeth 2212 via the insulator 222, the teeth 2212 being radially arranged around the center axis J1.

The motor rotor unit 3 preferably includes a shaft 31 which is centered about the center axis J1, a yoke 32 which has a substantially cylindrical shape, a field magnet 33, and a cover member 34 which is made of nonmagnetic material. The yoke 32 is preferably provided by placing thin magnetic steel plates on top of one another and is fixed around the shaft 31. The field magnet 33 is preferably fixed to the outer circumferential surface of the yoke 32 by adhesive, for example. The cover member 34 preferably covers the outer surface of the field magnet 33 to prevent the field magnet 33 from being removed from the yoke 32. In the motor 1, the field magnet 33 is preferably disposed near a portion of the armature 22 which is adjacent to the center axis J1. Thus, a torque is preferably generated between the armature 22 and the field magnet 33 so as to be centered about the center axis J1.

The bearing mechanism 4 preferably includes an upper ball bearing 42 which is provided on the inner circumferential surface of the bracket 24, and a lower ball bearing 43 which is provided on the central portion of the bottom of the housing 21. The shaft 31 of the motor rotor unit 3 preferably protrudes upwards from the upper surface of the bracket 24 via an opening of the bracket 24 and is rotatably supported by the upper ball bearing 42 and the lower ball bearing 43.

The resolver 5 preferably includes a resolver stator unit 51 which is a substantially annular stationary unit which is centered about the center axis J1, and a resolver rotor unit 52 which is fastened to the shaft 31 of the motor rotor unit 3 above the yoke 32 inside the resolver stator unit 51 (that is, adjacent to the center axis J1). The resolver rotor unit 52 preferably includes a substantially annular shape which is centered about the center axis J1. The resolver rotor unit 52 which is a rotatable unit preferably including a rotor core 521 which is provided by placing annular magnetic steel plates on top of one another. The resolver stator unit 51 and the resolver rotor unit 52 are preferably disposed inside the busbar unit 23 (that is, adjacent to the center axis J1) which has a substantially annular shape centered about the center axis J1.

The resolver stator unit 51 preferably includes a stator core 511 which is provided by placing thin magnetic steel plates on top of one another and is fastened to the inner circumferential surface of the bracket 24. The stator core 511 preferably includes an annular core-back 5111 and teeth 5112 (for example, sixteen teeth in this preferred embodiment) which extend predetermined lengths from the core-back 5111 towards the center axis J1. In other words, inner ends of the teeth 5112 face the resolver rotor unit 52, and outer ends thereof which are opposite to the resolver rotor unit 52 are preferably supported by the core-back 5111.

Furthermore, the resolver stator unit 51 preferably includes an insulator 512 and a plurality (3 in the present preferred embodiment) of wires. The insulator 512 is preferably made of an insulating material such as thermoplastic resin, for example, and substantially covers the surfaces of the stator core. The plurality of wires (i.e., conductive wire) are preferably wound around each teeth 5112 which are arranged in approximately radial directions centered about the center axis J1 so as to provide a plurality of coils 513 thereat. Note that in the resolver 5, each coil 513 preferably includes one phase excitation coil and one phase output coil, which will be explained later herein.

Figure 4:
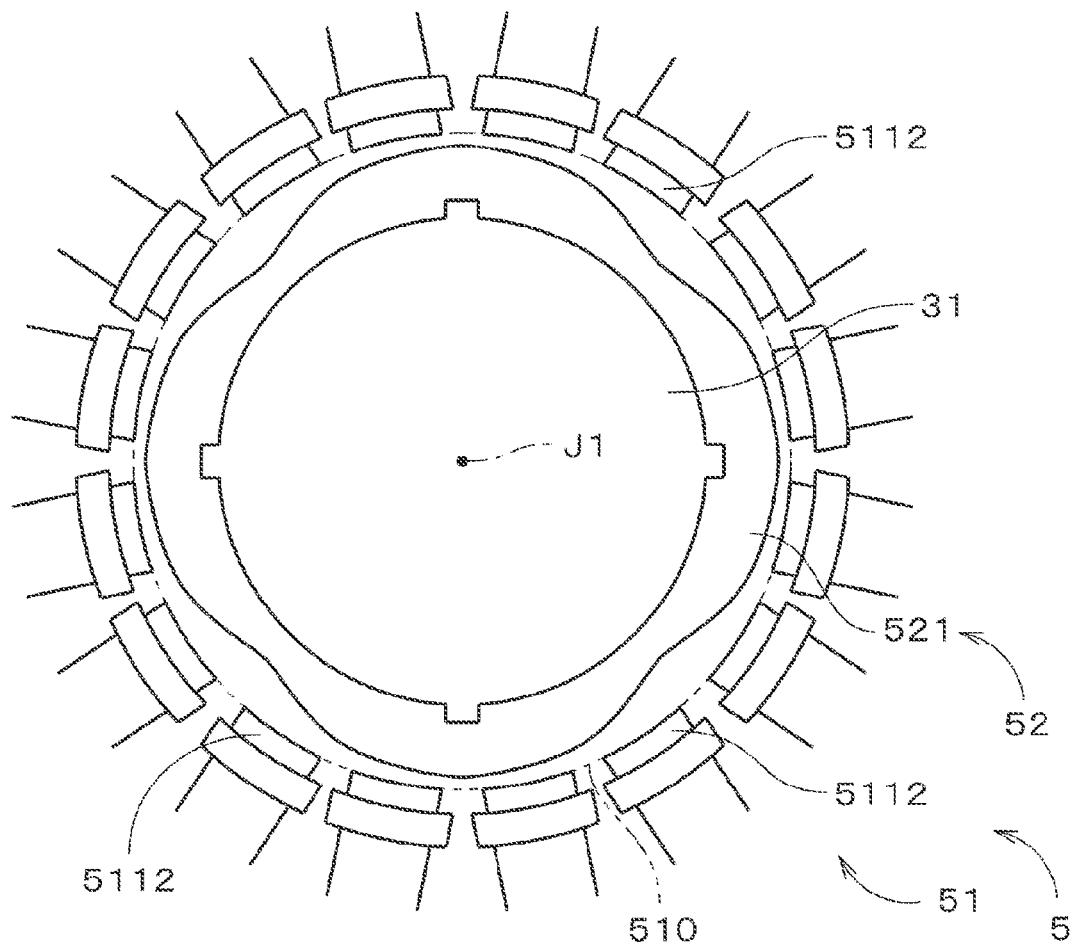
FIG. 4 is a plan view showing a shaft and a portion of a resolver according to the first preferred embodiment of the present invention.

FIG. 4 is a plan view showing the shaft 31 and a portion of the resolver 5. For clarity of depiction, FIG. 4 omits the coil 513 (see, FIG. 3) of the resolver stator unit 51. Also note that a cross section of the shaft 31 is depicted without hatch lines. As shown in FIG. 4, the rotor core 521 of the resolver rotor unit 52 into which the shaft 31 is fitted preferably includes a substantially non-circular shape when seen in the plan view. Furthermore, the rotor core 521 is preferably disposed at a position spaced apart from the inner circumferential surface of the resolver stator unit 51 (that is, a cylindrical surface which preferably includes the inner ends of the teeth 5112 adjacent to the center axis J1 and is designated by a double-dotted and dashed line 510 of FIG. 4) such that a gap is defined therebetween.

In the motor 1, the shaft 31 is preferably rotated around the center axis J1 by the torque generated between the armature 22 of the motor stator unit 2 and the field magnet 33 of the motor rotor unit 3 shown in FIG. 3. By virtue of such configuration, the rotor core 521 of the resolver rotor unit 52 shown in FIG. 4 also rotates around the center axis J1 along with the motor rotor unit 3 (see, FIG. 3). Furthermore, as stated above, the resolver stator unit 51 is preferably fastened to the motor stator unit 2 (see, FIG. 3) via the bracket 24. Hence, in the resolver 5, the rotor core 521 of the resolver rotor unit 52 is preferably supported so as to be rotatable around the center axis J1 with respect to the resolver stator unit 51 via the shaft 31 and the bearing mechanism 4.

Figure 5:
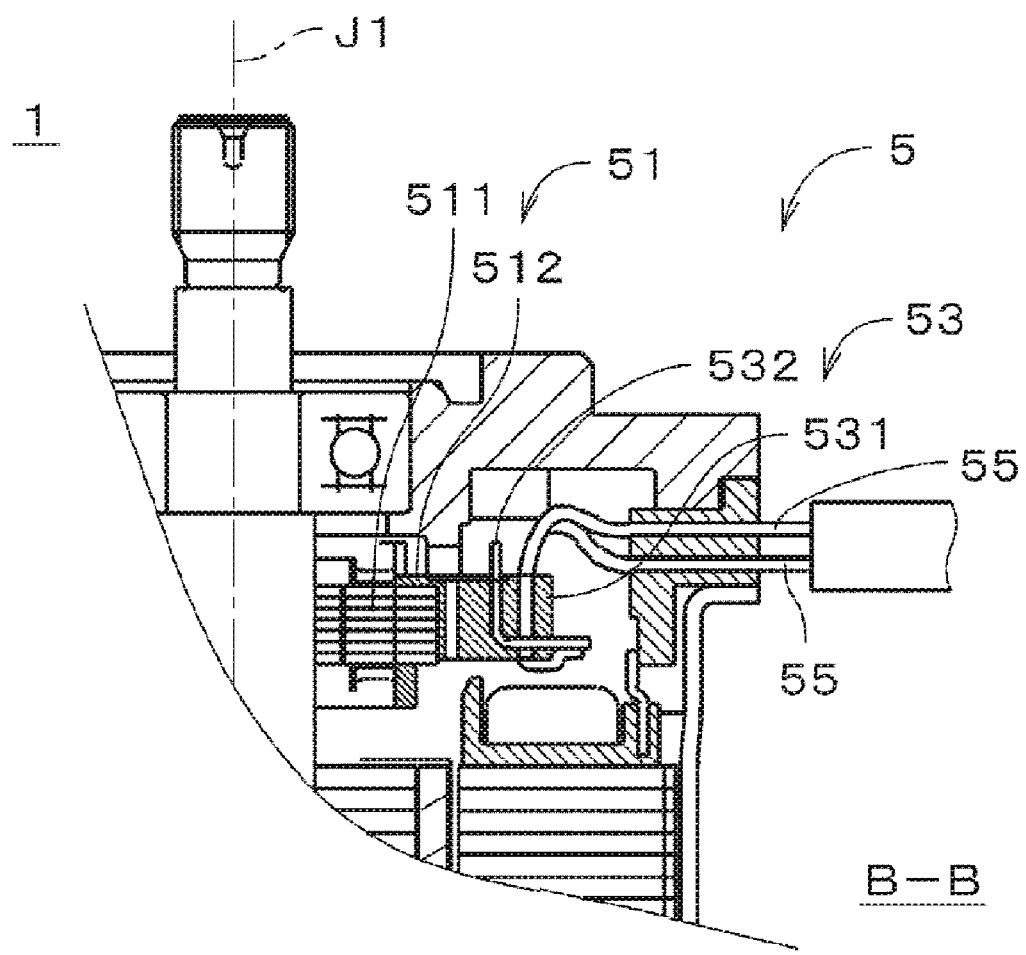
FIG. 5 is a longitudinal sectional view showing a portion of the motor according to the first preferred embodiment of the present invention.

FIG. 5 is a sectional view taken along the line B-B of FIG. 2, showing a portion of the motor 1. As shown in FIG. 5, the resolver 5 preferably further includes a connector unit 53 which connects the resolver stator unit 51 to lead lines 55 which extends outside the resolver 5. The resolver stator unit 51 is preferably connected to an external control unit 63 (see, FIG. 1) through the lead lines 55. The connector unit 53 preferably protrudes outwards from the resolver stator unit 51 in a radial direction (that is, in the direction away from the center axis J1) and is disposed in an opening which is arranged circumferentially in the busbar unit 23 (see, FIG. 3).

The connector unit 53 preferably includes a terminal holder 531 which protrudes outwards from the resolver stator unit 51 in a radial direction, and terminal pins 532 (in this preferred embodiment, six terminal pins) which protrude from the terminal holder 531 upwards in the direction substantially parallel to the center axis J1 (i.e., in the direction substantially perpendicular to a plane normal to the center axis J1) and are arranged in the direction perpendicular to the center axis J1. In FIG. 5, for clarity of depiction, only one terminal pin 532 is illustrated. In this preferred embodiment, each terminal pin 532 is made of copper.

Figure 6:
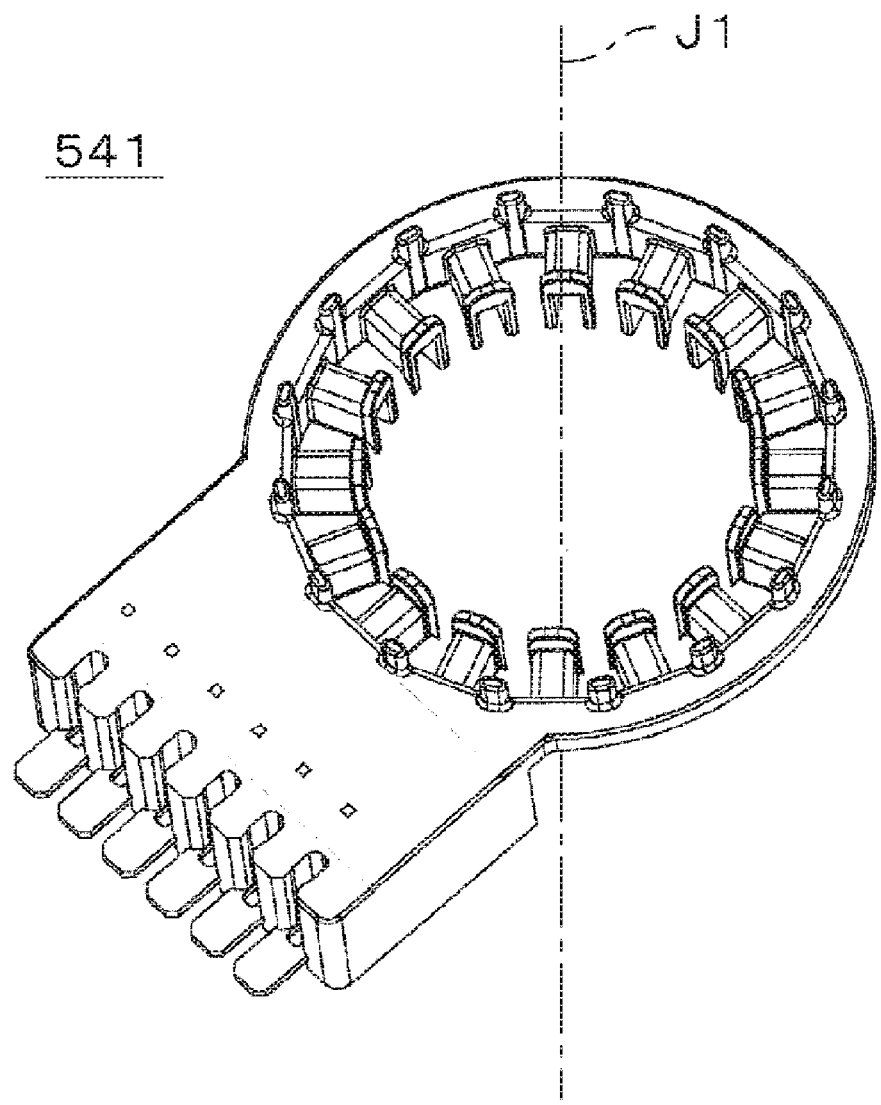
FIG. 6 is a perspective view illustrating a first division body according to the first preferred embodiment of the present invention.

The terminal holder 531 is preferably made of a thermoplastic resin material and is integrally arranged with the insulator 512 which is also made of thermoplastic resin. The terminal holder 531 and the insulator 512 are preferably each divided into upper and lower parts with respect to the direction parallel to the center axis J1. A first division body 541 shown in FIG. 6 and a second division body, which includes a shape substantially identical to that of the first division body 541 other than a portion corresponding to the terminal holder 531, are preferably attached to the stator core 511 of the resolver stator unit 51 of FIG. 5 at upper and lower positions with respect to the direction parallel to the center axis J1.

Figure 7:
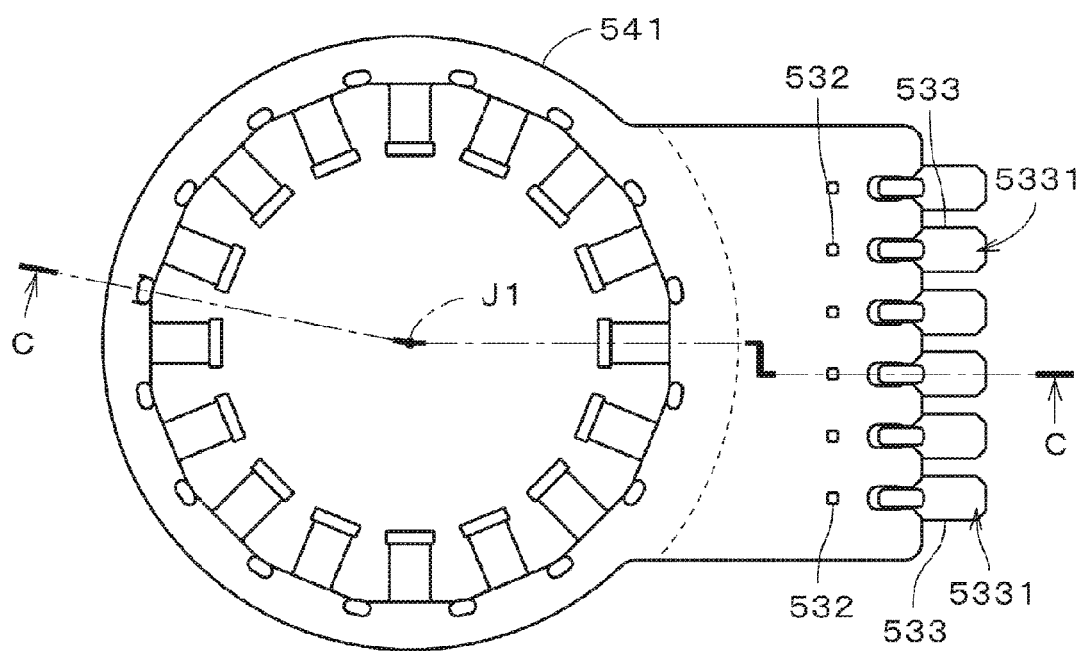
FIG. 7 is a plan view illustrating the first division body and terminal pins according to the first preferred embodiment of the present invention.
Figure 8:
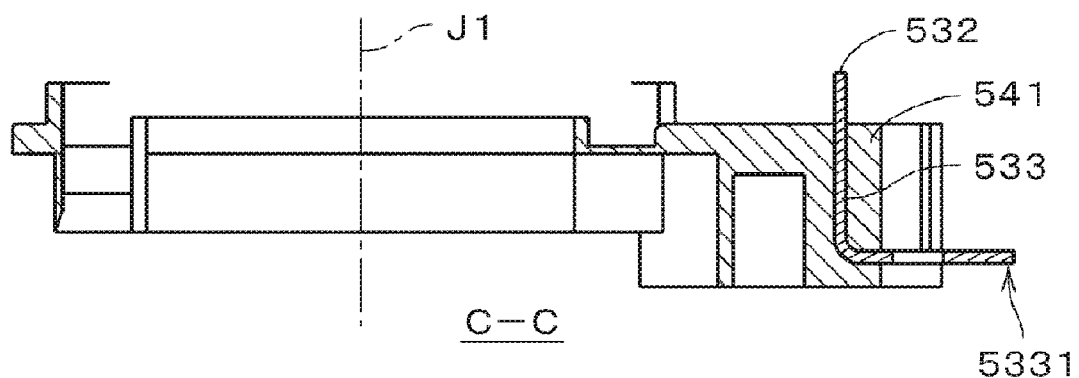
FIG. 8 is a longitudinal sectional view illustrating the first division body and the terminal pin according to the first preferred embodiment of the present invention.

FIG. 7 is a plan view illustrating the first division body 541 and the terminal pins 532. FIG. 8 is a sectional view taken along the line C-C of FIG. 7, illustrating the first division body 541 and the terminal pin 532. For clarity of depiction, in FIG. 7, a portion of the first division body 541 corresponding to the terminal holder 531 (see, FIG. 5) is disposed to the right based on the center axis J1, unlike FIG. 2 showing the motor 1 (that is, the orientation of the motor 1 of FIG. 2 is different from that of FIG. 7).

As shown in FIGS. 7 and 8, each terminal pin 532 having a substantially prismatic shape is a portion of a corresponding L-shaped resolver terminal 533. An end portion 5331 of each resolver terminal 533 which is opposite end from the terminal pin 532 preferably protrudes outwards from the outer sidewall of the portion of the first division body 541 corresponding to the terminal holder 531 (that is, the sidewall farthest from the center axis J1). Furthermore, the end portion 5331 is preferably connected to the control unit 63 via the corresponding lead line 55 (see, FIG. 5). The resolver terminals 533 which are provided in the portion of the first division body 541 corresponding to the terminal holder 531 preferably are integrally arranged with the first division body 541 by insert molding, for example.

Figure 9:
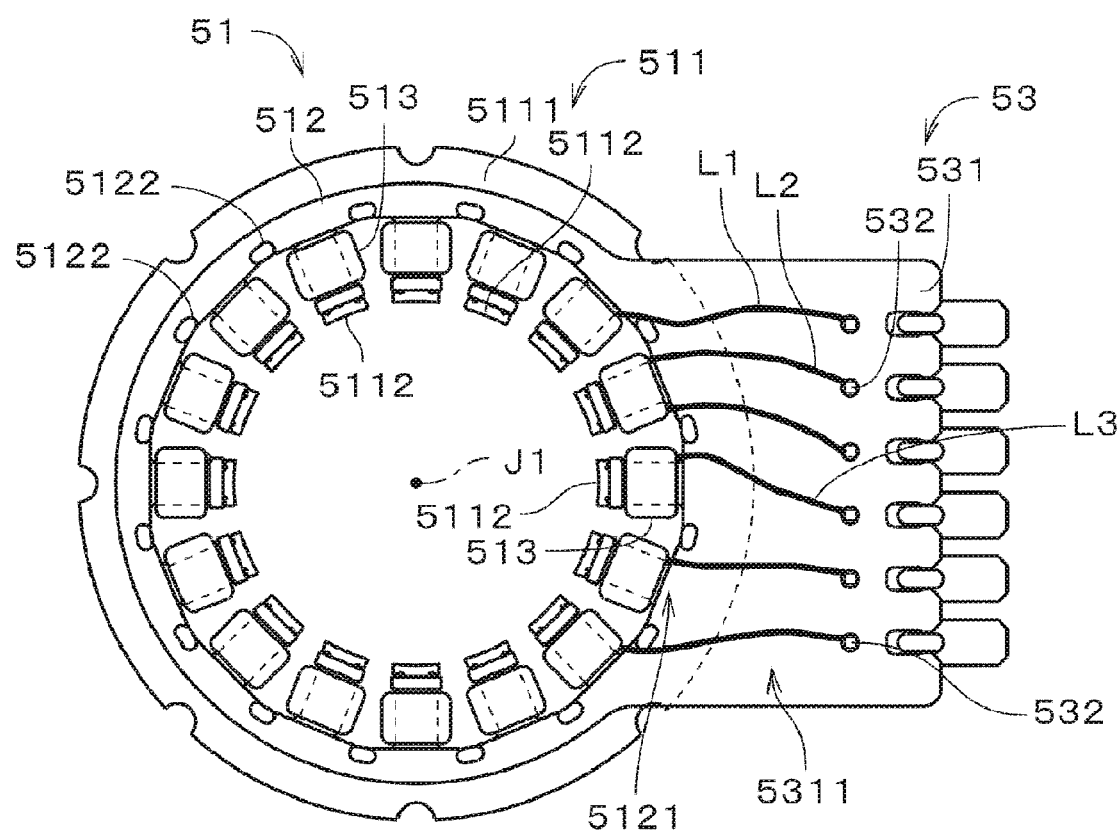
FIG. 9 represents a resolver stator unit and a connector unit according to the first preferred embodiment of the present invention.

FIG. 9 is a plan view illustrating the resolver stator unit 51. As shown in FIG. 9, the wires L1, L2 and L3 which form the coils 513 are preferably wired on the terminal holder 531 of the connector unit 53 in an area 5311. The area 5311 preferably ranges from an annular surface 5121, which is arranged on the core-back 5111 of the insulator 512 in a direction perpendicular to the center axis J1, to the terminal pins 532. Hereinafter, the area 5311 arranged on the terminal holder 531 will be called "wiring surface 5311". The opposite ends of the wires L1, L2 and L3 are preferably connected to the terminal pins 532 by welding, for example, and are connected to the control unit 63.

To be more specific, as shown in FIG. 9, first ends of each wire L1, L2, L3 are preferably wound around the corresponding terminal pin 532, drawn to the stator core 511 via the wiring surface 5311 of the terminal holder 531, and sequentially wound the teeth 5112 via the insulator 512 (in detail, each of the wires L2 and L3 is wound around only half the number of teeth 5112). It is to be noted that connection wires which pass through protrusions designated by the reference numeral 5122 of FIG. 9 are present between the adjacent teeth 5112, but the depiction of the connection wires is omitted in FIG. 9 (these are also applied in common to the cases of FIGS. 13 and 14).

The wires L1, L2, L3 each wound around the teeth 5112 preferably pass through the wiring surface 5311 and are led to the terminal pins 532. Thereafter, a second end of the wires L1, L2, L3 each are preferably wound one of the terminal pins 532 other than the terminal pin 532 around which the first end of the wire L1, L2, L3 is wound. In the resolver 5, the ends of the wires L1, L2 and L3 each are wound around the respective terminal pins 532. The wires L2 and L3 form output coils, and the remaining one wire L1 forms excitation coils. Hereinafter, the wires L2 and L3 are called output wires, and the wire L1 is called an excitation wire.

Figure 10:
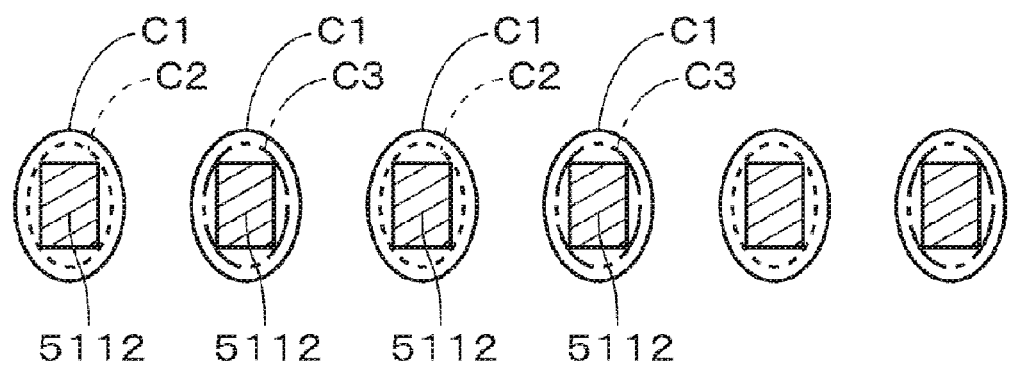
FIG. 10 depicts an output coil and an excitation coil which are provided on each of teeth according to the first preferred embodiment of the present invention.

FIG. 10 illustrates the output coils and the excitation coils provided on the teeth 5112. In FIG. 10, the cross sections of the teeth 5112, which are arranged in the circumferential direction, are depicted in such a way as to arrange them in a lateral direction on one plane. Each of the excitation coils formed by the excitation wire L1 is depicted by an ellipse of a solid line designated by the reference character C1. Each of the output coils formed by the output wires L2 is depicted by an ellipse of a dashed line designated by the reference character C2. Each of the output coils formed by the output wires L3 is depicted by an ellipse of a dotted and dashed line designated by the reference character C3 (these are also applied in common to the cases of FIGS. 15 and 19). The depiction of the insulator 512 is omitted.

As shown in FIG. 10, in the resolver 5, one of the two output wires L2 and L3 is preferably wound around each tooth 5112 such that one output coil C2 or C3 is formed on each tooth 5112. The output coils C2 formed by the output wire L2 and the output coils C3 formed by the output wire L3 are preferably provided on the teeth 5112 alternately in the circumferential direction. Furthermore, the excitation wire L1 is preferably wound around each tooth 5112 such that it overlaps the output coil C2 or C3 (that is, the output wire L2 or L3), thus forming the excitation coil C1. As such, in the resolver 5 according to this preferred embodiment, the excitation coil C1 is preferably provided around each of the output coils C2 and C3, which are respectively formed on the teeth 5112 by the output wires L2 and L3. Note that with respect to the direction in which each tooth 5112 extends the length (in other words, in the radial direction centered about the center axis J1), the width of the output coil C2 or C3 is preferably about the same as that of the excitation coil C1, and the number of turns in the output coil C2 or C3 is greater than that of the excitation coil C1. Also, the thickness of the excitation wire L1 is preferably the same as that of each of the output wires L2 and L3.

Figure 11:
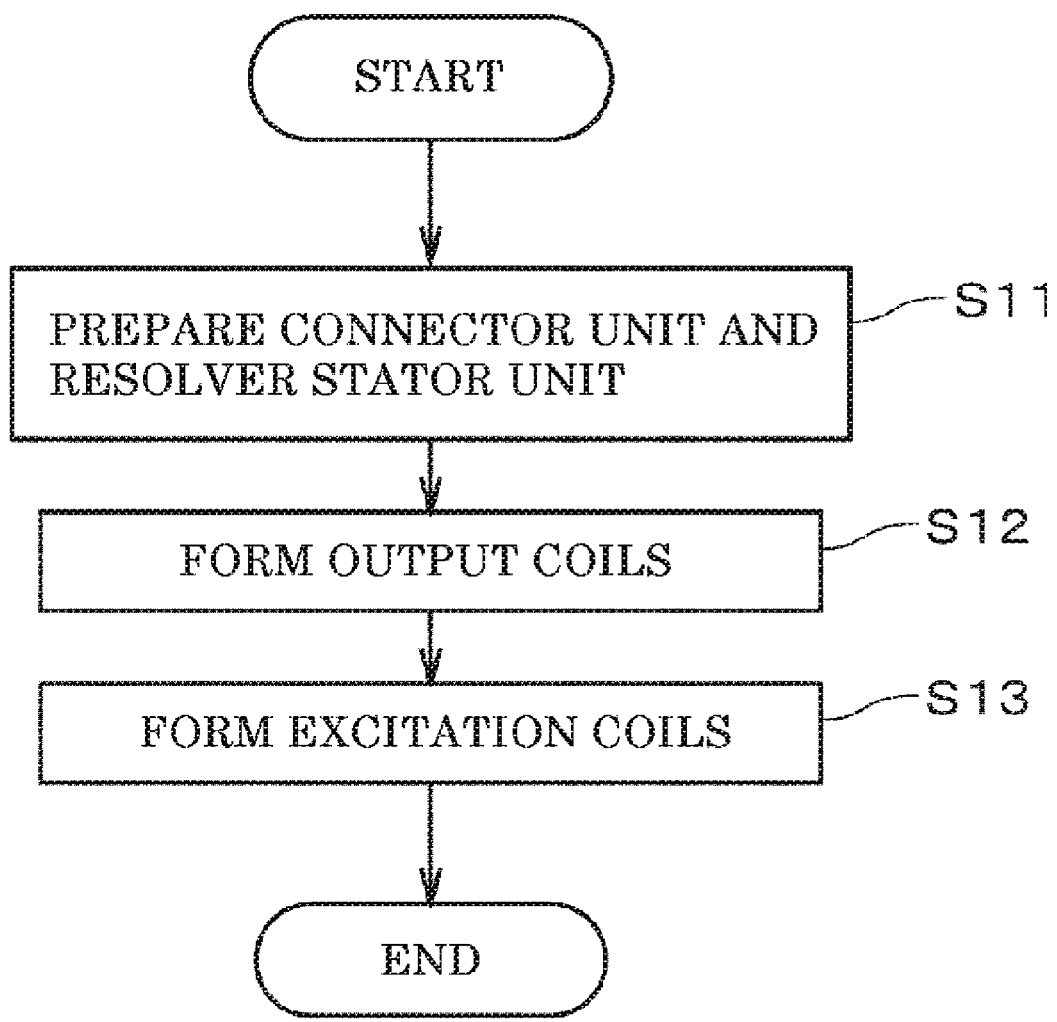
FIG. 11 is a block diagram illustrating a process of installation of an excitation wire and an output wire according to the first preferred embodiment of the present invention.
Figure 12:
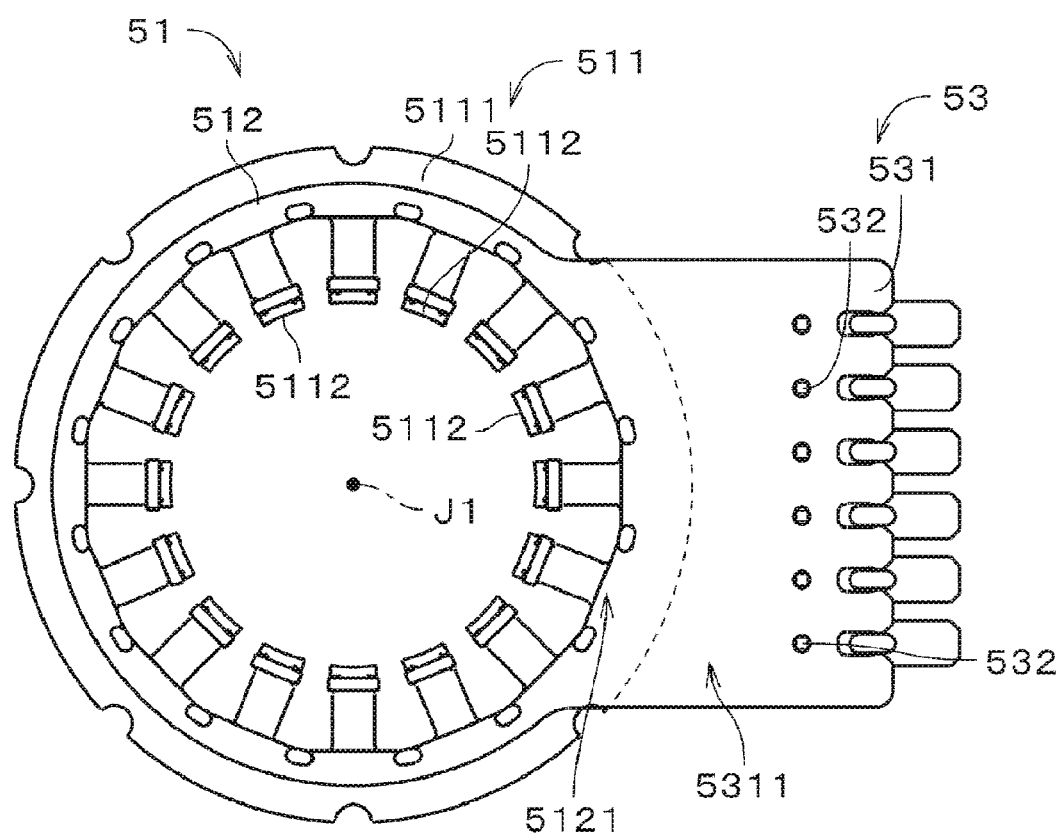
FIG. 12 is a plan view showing the resolver stator unit in a manufacturing process according to the first preferred embodiment of the present invention.

Next, installation (i.e., attachment) of the excitation wire L1 and the output wires L2 and L3 in a process of manufacturing the resolver 5 will be explained with reference to FIG. 11. For the installation of the excitation wire L1 and the output wires L2 and L3, the insulator 512 which is arranged integrally with the connector unit 53 is preferably attached to the upper and lower ends of the stator core 511. Then, as shown in FIG. 12, the resolver stator unit 51 is preferably prepared along with the connector unit 53, the resolver stator unit 51 including the teeth 5112 arranged around the center axis J1 in the circumferential direction, the annular core-back 5111 for supporting the outer ends of the teeth 5112, and the insulator 512 substantially covering the surface of the core-back 5111 (but, other than the excitation coil C1 and the output coils C2 and C3) (S11).

After the connector unit 53 and the resolver stator unit 51 have been prepared, the output wire L2 is preferably wound around one terminal pin 532 in such a way that one end of the output wire L2 is held by a holding part of a winder around a connection portion (a base portion coupled to the connector unit 53) of the terminal pin 532, and a nozzle of the winder which discharges the output wire L2 rotates around the terminal pin 532 multiple times. Subsequently, the nozzle of the winder preferably passes over the wiring surface 5311 of the connector unit 53 and the annular surface 5121 of the insulator 512 and reaches one tooth 5112. Thereafter, the output wire L2 is preferably wound around the tooth 5112 via the insulator 512 in such a way that the nozzle of the winder rotates around the tooth 5112.

To be more specific, the output wire L2 is preferably wound around the tooth 5112 in such a way that the nozzle of the winder rotates around the tooth 5112 at a constant angular speed and moves at a constant speed from a connection portion (a base portion coupled to the core-back 5111) of the tooth 5112 to the inner end thereof. Then, a first layer of the output coil C2 is preferably formed at the most inner position (at a position most adjacent to the tooth 5112). Thereafter, the nozzle of the winder preferably rotates around the tooth 5112 and moves from the inner end of the tooth 5112 to the base portion thereof. Then, the output wire L2 is preferably wound around the first layer of the tooth 5112, thus forming a second layer. Then, the nozzle of the winder preferably repeats the operation of rotating around the tooth 5112 and reciprocating between the base portion and the inner end of the tooth 5112. In this process, a third layer is preferably formed around the second layer when the nozzle of the winder moves to the inner end of the tooth 5112, and a fourth layer is formed around the third layer when the nozzle of the winder moves to the base portion of the tooth 5112.

As such, the output coil C2 including the first through fourth layers is preferably formed at the tooth 5112 by reciprocating the nozzle of the winder between the base portion of the tooth 5112 and the inner end thereof two times. Here, although it is not certainly necessary to exactly stack the first through fourth layers of the output coil C2 on top of one another in the direction away from the tooth 5112, it is to be understood that the output coil C2 is preferably formed with four layers as a whole.

Furthermore, the first through fourth layers of the output coil C2 preferably include the same width with respect to the direction in which the tooth 5112 extends the length, and have the same number of turns. In the resolver 5 according to this preferred embodiment, the number of turns in the output coil C2 of each tooth 5112 is approximately 124, so that the number of turns in each layer of the output coil C2 becomes approximately 31.

Figure 13:
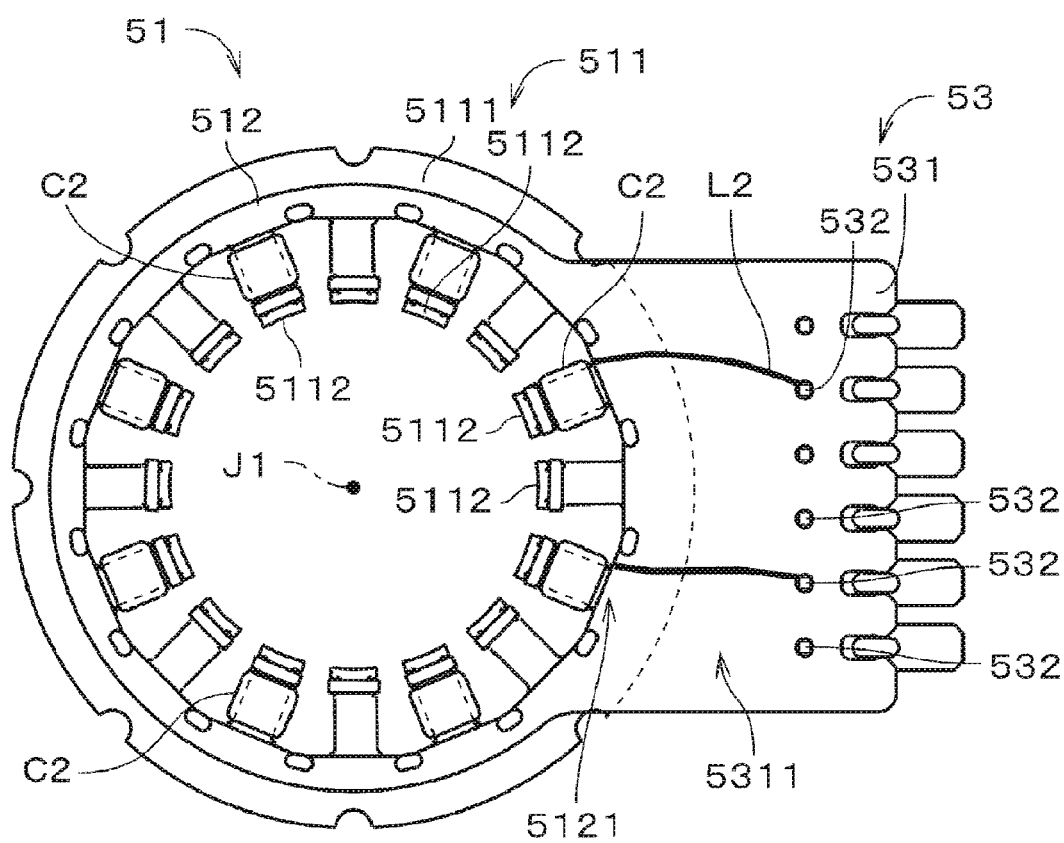
FIG. 13 is another plan view showing the resolver stator unit in the manufacturing process according to the first preferred embodiment of the present invention.

After the operation of winding the output wire L2 around one, that is, a first, tooth 5112 has been completed, the nozzle of the winder preferably skips a second tooth 5112 and moves to a third tooth 5112, the first through third teeth 5112 being sequentially arranged in the circumferential direction. Thereafter, the nozzle of the winder is preferably actuated in the same manner as that in the operation of winding the output wire L2 around the first tooth 5112, thus forming an output coil C2 on the third tooth 5112. In the above manner, as shown in FIG. 13, of the teeth 5112 which are arranged around the center axis J1 in the circumferential direction at regular intervals, the output coils C2 preferably are sequentially provided on the teeth 5112 which are disposed at every other location. After the operation of winding the output wire L2 around half (eight, in the present preferred embodiment) of the teeth 5112 has been completed, the output wire L2 passes over the annular surface 5121 of the insulator 512 and the wiring surface 5311 of the connector unit 53 and is led to one of terminal pins 532 other than the terminal pin 532 around which the first end of the output wire L2 is wound. Thereafter, the output wire L2 is wound around the corresponding terminal pin 532 in such a way as to rotate the nozzle of the winder around the terminal pin 532 several times. Subsequently, the output wire 12 is preferably cut at a position adjacent to the end of the nozzle of the winder, thus completing the installation of the output wire L2.

Figure 14:
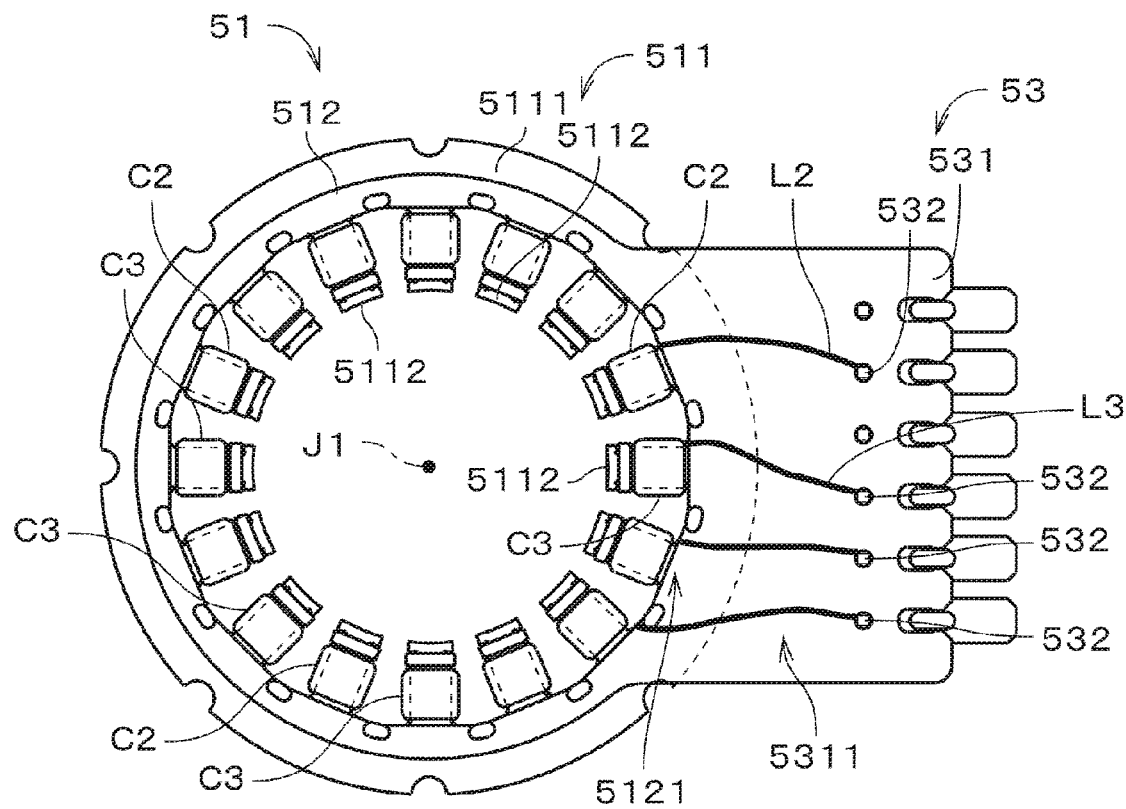
FIG. 14 is another plan view showing the resolver stator unit in the manufacturing process according to the first preferred embodiment of the present invention.

Thereafter, in the same manner as the installation of the output wire L2, the output wire L3 discharged from the nozzle of the winder is preferably wound around one of the terminal pins 532 other than the terminal pins 532, around which the outer wire L2 are wound. Subsequently, the output wire L3 preferably is sequentially wound around the teeth 5112 other than the teeth 5112, on which the output coils C2 are formed. Hence, the output coils C3 are sequentially formed on the teeth 5112 which are disposed at every other location, in the same manner as that of the output coils C2. Thereafter, the output wire L3 is preferably wound around another terminal pin 532, thus completing the installation of the output wire L3. As such, the two output wires L2 and L3 are preferably wound around the teeth 5112 alternately in the circumferential direction, so that the output coil C2 or C3 is formed on every tooth 5112, as shown in FIG. 14 (S12). Note that, the output coils C3 may be formed before the output coils C2 are formed.

After the output coils C2 and C3 have been formed, in the same manner as the installation of the output wires L2 and L3, the excitation wire L1 discharged from the nozzle of the winder is preferably wound around one of the terminal pins 532 other than the terminal pins 532, around which the output wires L2 and L3 are wound. Thereafter, the nozzle of the winder preferably moves to one tooth 5112 and rotates around the tooth 5112. Thereby, the excitation wire L1 is wound around the tooth 5112 such that it substantially overlaps the corresponding output wire L2 or L3.

Here, when the nozzle of the winder once reciprocates between the base portion of the tooth 5112 and the inner end thereof, the excitation coil C1 are preferably formed in multiple layers (which includes, e.g., a first layer and a second layer) on the tooth 5112. The width of the excitation coil C1 with respect to the direction in which the tooth 5112 extends the length is approximately the same as that of the output coil C2 or C3. The number of turns in the first layer of the excitation coil C1 is equal to that of the second layer thereof. In the resolver 5 according to this preferred embodiment, the number of turns of the excitation coil C1 formed on the tooth 5112 is approximately 36, so that the number of turns in each layer of the excitation coil C1 becomes approximately 18. Furthermore, in each tooth 5112, a winding pitch of the output wire L2 or L3 of each layer of the output coil C2 or C3 (the winding pitch is given by the width of the layer divided by the number of turns and is called a coil pitch) preferably differs from a winding pitch of the excitation wire L1 of each layer of the excitation coil C1.

After the operation of winding the excitation wire L1 around one, that is, a first, tooth 5112 has been completed, the nozzle of the winder preferably moves to a subsequent tooth 5112 adjacent to the first tooth 5112 with respect to the circumferential direction. Thereafter, an excitation coil C1 is preferably formed at the corresponding tooth 5112 in the same manner as that in the first tooth 5112. In the above manner, the excitation wire L1 is preferably wound around all the teeth 5112, so that excitation coils C1 having approximately the same shape are provided. Subsequently, the excitation wire L1 is preferably wound around the remaining one of the terminal pins 532, thus completing the installation of the excitation wire L1 (S13). As a result, the resolver stator unit 51 is preferably completed, as shown in FIG. 9. The resolver stator unit 51, along with the resolver rotor unit 52 assembled through a separate process, is preferably installed in the motor 1, and is used to detect a rotational angle of the motor 1.

Figure 15:
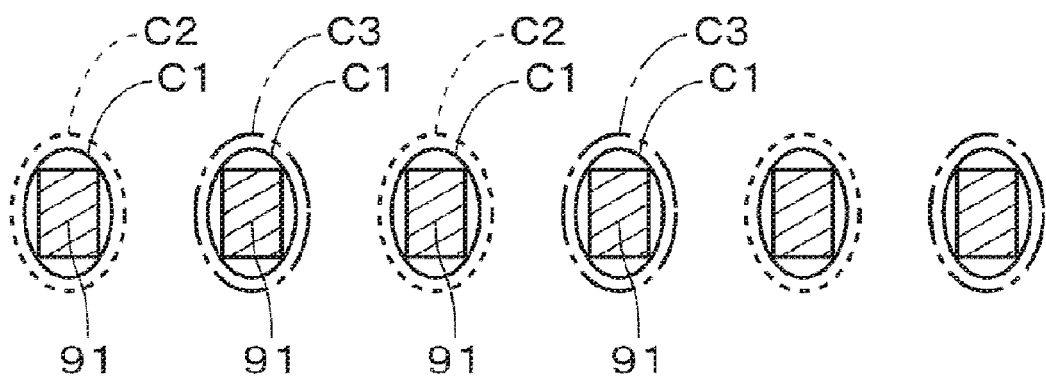
FIG. 15 presents an output coil and an excitation coil which are provided on each of teeth according to a comparative example.

FIG. 15 is a view corresponding to FIG. 10, but schematically showing output coils C2 and C3 and excitation coils C1 of teeth 91 of a resolver stator unit according to a comparative example. As shown in FIG. 15, in the resolver stator unit according to the comparative example, an excitation wire is wound around the teeth 91 to form the excitation coils C1 on the respective teeth 91. Thereafter, output wires are wound around the excitation coils C1 to form the output coils C2 and C3. The numbers of turns of each excitation coil C1 and each output coil C2, C3 of the resolver stator unit of the comparative example are the same as those of the resolver stator unit 51 of FIG. 9. However, in the output coils C2 and C3 formed on the excitation coils C1 of the comparative example, the possibility of an event in which a wound state of the coils is deformed is increased, compared to the resolver stator unit 51 of FIG. 9 in which the output coils C2 and C3 are formed by directly winding the output wires around the teeth 5112 via the insulator 512.

Figure 16:
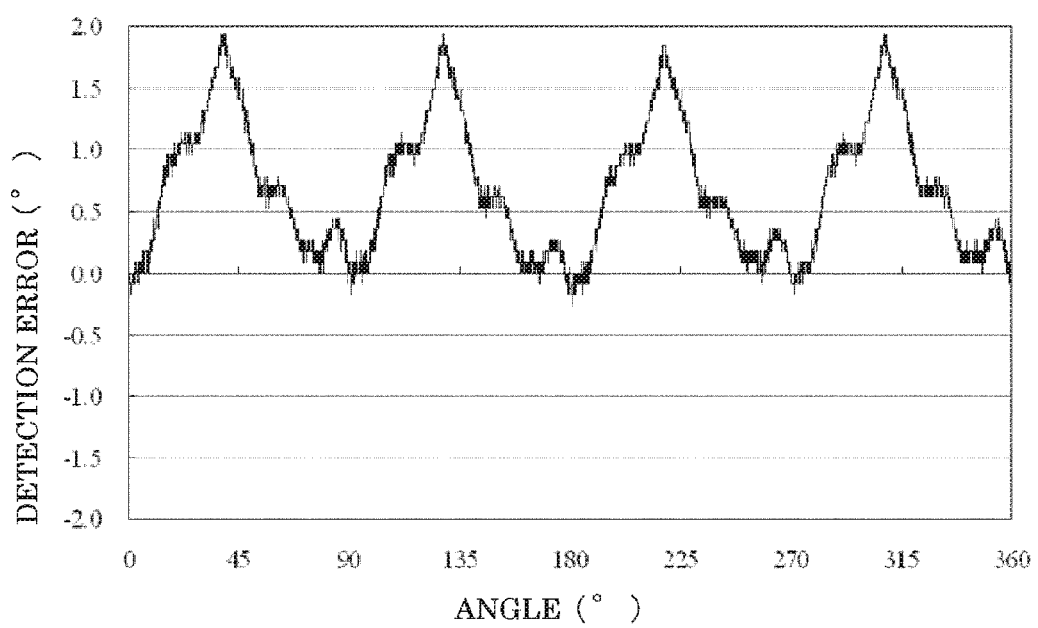
FIG. 16 is a graph showing a detection error of a valued detected by a resolver as a function of a rotational angle of a motor according to the comparative example.
Figure 17:
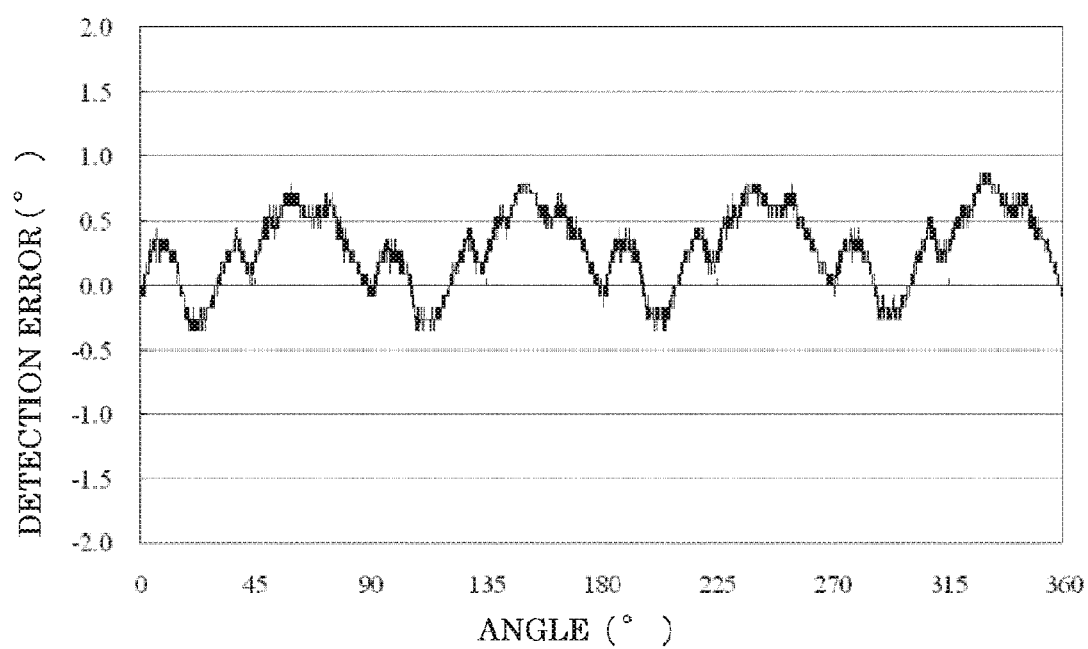
FIG. 17 is a graph showing a detection error of a valued detected by the resolver as a function of a rotational angle of the motor according to the first preferred embodiment of the present invention.

FIGS. 16 and 17 are graphs showing a relationship between a real rotational angle of the motor and a detection error of a value detected by the resolver when the rotational angle of the motor is measured by the resolver during one revolution of the motor. FIG. 16 shows the relationship therebetween when the resolver stator unit of the comparative example is used. FIG. 17 shows the relationship therebetween when the resolver stator unit 51 of FIG. 9 is used. Furthermore, the horizontal axis of each of FIGS. 16 and 17 denotes a real rotational angle of the motor, and the vertical axis denotes a detection error of a value detected by the resolver.

In the resolver having the resolver stator unit of the comparative example, as shown in FIG. 16, a detection error of maximally 1.9° occurs. However, in the resolver 5 having the resolver stator unit 51 of FIG. 9, as shown in FIG. 17, the detection error is limited to approximately 0.8° or less. From this, it is to be understood that the detection accuracy of the resolver 5 is relatively high.

As stated above, in the resolver 5, the output coils C2 and C3 are preferably formed on the corresponding teeth 5112 in such a way as to wind the output wires L2 and L3 around the corresponding teeth 5112. Thereafter, the excitation coils C1 are preferably formed on the respective output coils C2 and C3 in such a way as to wind the excitation wire L1 around the output coils C2 and C3. Therefore, the wound state of the output coils C2 and C3 can be prevented from being deformed. Hence, the detection accuracy of the resolver 5 is improved. As a result, the motor 1 having the resolver 5 and the power steering apparatus 6 having the motor 1 have high accuracy in operation.

Furthermore, in the resolver stator unit 51, a winding pitch of the output wire L2 or L3 of each layer of the output coil C2 or C3 is preferably less than a winding pitch of the excitation wire L1 of each layer of the excitation coil C1. Thus, the excitation coil C1 is formed around the output coil C2 or C3 such that the excitation coil C1 is preferably smaller than the output coil C2 or C3. Therefore, the wound state of the excitation coil C1 can be prevented from being deformed, and the detection accuracy of the resolver 5 is improved.

Figure 18:
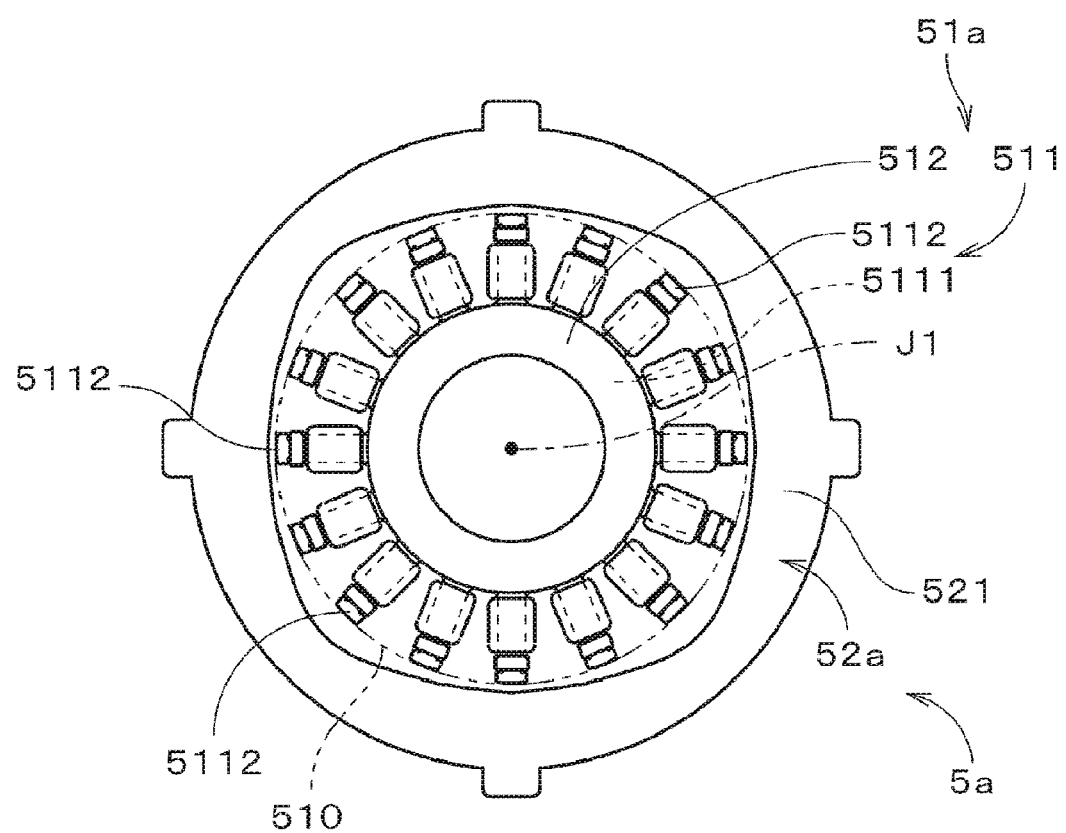
FIG. 18 describes a resolver, according to a second preferred embodiment of the present invention.

FIG. 18 illustrates a resolver 5a according to a second preferred embodiment of the present invention. The resolver 5a of FIG. 18 preferably includes a resolver stator unit 51a which is a substantially annular stationary unit which is centered about a center axis J1, and a resolver rotor unit 52a which is provided around the resolver stator unit 51a and includes a substantially annular shape. The resolver rotor unit 52a which is a rotatable preferably includes a rotor core 521 which is provided by placing magnetic steel plates having substantially annular shapes on top of one another.

The resolver stator unit 51a of FIG. 18 preferably includes a stator core 511. The stator core 511 preferably includes an annular core-back 5111, and teeth 5112 (in this preferred embodiment, sixteen teeth) which extend from the core-back 5111 outwards (in the direction away from the center axis J1). Outer ends of the teeth 5112 face the resolver rotor unit 52. The resolver stator unit 51a preferably further includes an insulator 512 which substantially covers the surface of the stator core 511. In the resolver stator unit 51a, an output coil C2 or C3 having several layers is preferably formed on each tooth 5112 in such a way as to wind an output wire L2 or L3 around the tooth 5112 via the insulator 512 in a predetermined number of turns, in the same manner as the resolver stator unit 51 of FIG. 9. In addition, an excitation coil C1 is preferably formed on each tooth 5112 in such a way as to wind an excitation wire L1 around the output wire L2 or L3 of each tooth 5112 in the number of turns less than that of the output coil C2 or C3 (see, FIG. 10).

Furthermore, the resolver rotor unit 52a is preferably supported so as to be rotatable with respect to the resolver stator unit 51a. For this, a rotor core 521 of the resolver rotor unit 52a is preferably disposed to be spaced apart from a circumferential outer surface of the resolver stator unit 51a (in other words, a cylindrical surface which includes the outer ends of the teeth 5112 and is designated by a double-dotted and dashed line 510 of FIG. 18) such that a gap is defined therebetween.

In the same manner as the first preferred embodiment, in the outer rotor type resolver 5a of FIG. 18, the output coils C2 and C3 having the number of turns greater than that of excitation coil C1 are preferably formed before the excitation coil C1 is formed. Thus, the wound state of the output coil C2 or C3 can be prevented from being deformed, and the detection accuracy of the resolver 5 is improved.

Note that, although the preferred embodiments of the present invention have been illustrated, the present invention is not limited to the preferred embodiments, and various modifications are possible.

Figure 19:
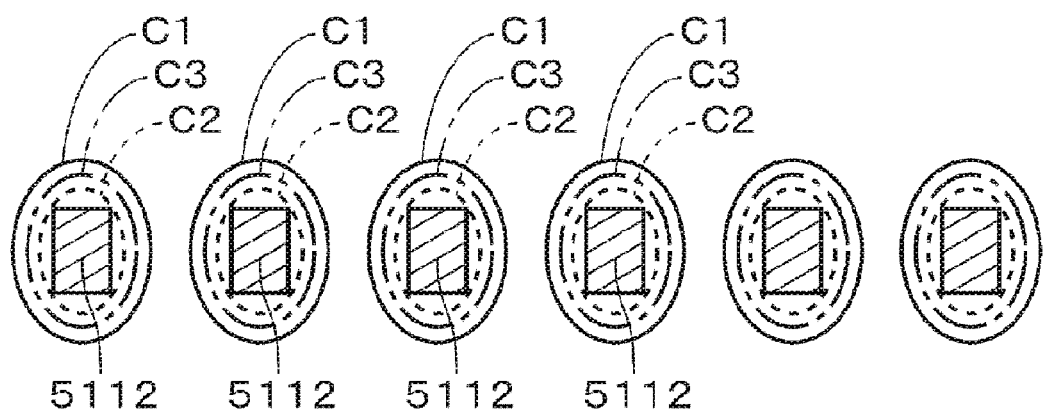
FIG. 19 illustrates output coils and excitation coils of another example of the resolver stator unit according to each preferred embodiment of the present invention.

For example, in the resolver 5 or 5a of FIG. 4 or 18, although one output coil C2 or C3 has been illustrated as being formed on each tooth 5112 in such a way as to wind the output wire L2 or L3 around the tooth 5112, the coils may be formed on each tooth 5112 in such a way that one output coil C2 is formed by winding the output wire L2 around the tooth 5112, the other output coil C3 is formed on each tooth 5112 by winding the output wire L3 around the output coil C2, and the excitation coil C1 is formed on each tooth 5112 by winding the excitation wire L1 around the output coil C3, as shown in FIG. 19. In this case, the output coils C2 and C3 can also be prevented from being deformed and the detection accuracy of the resolver 5 is improved, compared to the case where the excitation coil C1 is formed inside the output coils C2 and C3 by first winding the excitation wire L1 around each tooth 5112.

As such, in the resolver 5, 5a, the output coils C2 and C3 are preferably formed on the teeth 5112 in such a way as to wind at least one of the output wires L2 and L3 around each tooth 5112 via the insulator 512, and the excitation coils C1 are formed on the teeth 5112 in such a way as to wind the excitation wire L1 around the output wire L2 or L3 of each tooth 5112. Therefore, the output coils C2 and C3 are preferably prevented from being deformed. In order to more reliably prevent the output coils C2 and C3 from being deformed, it is preferable that the two output wires L2 and L3 be wound around the teeth 5112 alternately in the circumferential direction, such that only one of the two output coils C2 and C3 is formed inside each excitation coil C1.

In the case where the number of turns in each of the output coils C2 and C3 is called a first number of turns, and the number of turns in the excitation coil C1 is called a second number of turns, in the above preferred embodiments, the first number of turns is approximately 124, and the second number of turns approximately 36. However, these numbers of turns are only one example proposed for the purpose of description of the present invention. For example, the first number of turns may be approximately 128, and the second number of turns may be approximately 32. In this case, the number of turns in each layer of the output coil C2 or C3 becomes approximately 32, and the number of turns in each layer of the excitation coil C1 becomes approximately 16. Alternatively, the first number of turns may be approximately 127, and the second number of turns may be approximately 33. In this case, the number of turns in each layer of the output coil C2 or C3 or the excitation coil C1 is preferably not constant. As such, the first or second number of turns of the resolver 5, 5a can be appropriately varied depending on the design conditions of the resolver 5, 5a.

Here, in each tooth 5112, if the first number of turns is three or more times as much as the second number of turns, the number of layers of each of the output coils C2 and C3 becomes greater than that of the excitation coil C1. In this case, if the excitation coil C1 is first formed before the output coil C2 or C3 is formed, the possibility of deformation of the wound state of the output coil C2 or C3 is increased. Therefore, the method of first forming the output coil C2 or C3 before the excitation coil C1 is preferably used in the case where the first number of turns is three or more times as much as (typically, six or less times as much as) the second number of turns.

Furthermore, in the resolver 5, 5a of FIG. 4 or 18, the number of teeth 5112 and the shape of the rotor core 521 are only for illustrative purposes and, thus, they may be appropriately vary depending on the design conditions of the resolver 5, 5a.

Moreover, the electric motor 1 may be used as, for example, a drive unit of an electric or hybrid vehicle, as well as a means for generating torque in the electric power steering apparatus. In addition, the electric motor 1 may be used as a drive unit for various kinds of apparatuses installed in the vehicle. Furthermore, the resolver of each of the above preferred embodiments may be used as a device for detecting the rotational angle of not only the motor 1 but also other rotary apparatuses.

While the invention has been shown and described with respect to the preferred embodiments, it will be understood by those skilled in the art that various changes and modifications may be made without departing from the scope and the spirit of the invention as defined in the following claims.

What is claimed is:

1. A resolver comprising:
a stationary unit having a substantially annular shape centered about a center axis; and
a rotary unit having a substantially annular shape centered about the center axis, the rotary unit arranged inside or outside of the stationary unit and supported so as to rotate around the center axis with respect to the stationary unit; wherein
the stationary unit includes:
teeth radially arranged around the center axis such that first ends of the teeth face the rotary unit;
an insulator arranged to cover surfaces of the teeth;
output coils including at least one of two output wires wound around each of the teeth via the insulator in a first number of turns; and
excitation coils including at least one excitation wire wound around each of the output coils in a second number of turns less than the first number of turns such that the at least one excitation wire overlaps the at least one of two output wires.

2. The resolver of claim 1, wherein the first number of turns is three times greater than the second number of turns.

3. The resolver of claim 1, wherein a winding pitch of the at least one of two output wires differs from a winding pitch of the at least one excitation wire.

4. The resolver of claim 1, wherein two output wires are wound around the teeth alternately in a circumferential direction around the center axis.

5. An electric motor comprising:
the resolver of claim 1;
a motor stator unit including an armature;
a motor rotor unit including a field magnet arranged to generate a torque centered about the center axis between the armature and the field magnet, the motor rotor unit supporting the rotary unit of the resolver thereon; and
a bearing mechanism arranged to support the motor rotor unit so as to rotate around the center axis with respect to the motor stator unit.

6. An electric power steering apparatus arranged to steer a vehicle, the electric power steering apparatus comprising:
the electric motor of claim 5;
a sensor arranged to detect a force applied to a steering wheel; and
a control unit arranged to control the electric motor depending on an output from the sensor.

7. A method of manufacturing a resolver including a stationary unit having an annular shape centered about a center axis, and a rotary unit having an annular shape centered about the center axis, the rotary unit disposed inside or outside of the stationary unit and supported so as to rotate around the center axis with respect to the stationary unit, the method comprising the steps of:
(a) arranging teeth radially around the center axis, wherein the stationary unit includes an insulator arranged to cover surfaces of the teeth;
(b) forming output coils by winding at least one of two output wires around each of the teeth via the insulator in a first number of turns; and
(c) forming excitation coils by winding at least one excitation wire around each of the output coils in a second number of turns less than the first number of turns such that the at least one excitation wire overlaps the at least one of two output wires.

* * * * *